(12) United States Patent
Cao

(10) Patent No.: US 9,548,663 B2
(45) Date of Patent: Jan. 17, 2017

(54) CIRCUITRY AND METHOD FOR ADJUSTING OUTPUT VOLTAGE

(71) Applicant: Shenzhen China Star Optoelectronics Technology Co., Ltd., Shenzhen, Guangdong (CN)

(72) Inventor: Dan Cao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 311 days.

(21) Appl. No.: 14/379,855

(22) PCT Filed: Jun. 27, 2014

(86) PCT No.: PCT/CN2014/080957
§ 371 (c)(1),
(2) Date: Aug. 20, 2014

(87) PCT Pub. No.: WO2015/188405
PCT Pub. Date: Dec. 17, 2015

(65) Prior Publication Data
US 2016/0248331 A1 Aug. 25, 2016

(30) Foreign Application Priority Data
Jun. 9, 2014 (CN) .......................... 2014 1 0250230

(51) Int. Cl.
*H02M 3/335* (2006.01)
*H02M 1/00* (2006.01)

(52) U.S. Cl.
CPC ..... *H02M 3/33507* (2013.01); *H02M 3/33576* (2013.01); *H02M 2001/0025* (2013.01)

(58) Field of Classification Search
CPC ............. H02M 2001/0074; H02M 2001/0003; H02M 3/158; H02M 3/22; H02M 3/285; H02M 3/315; H02M 3/335; H02M 3/33507; H02M 3/33515; H02M 3/33523; H02M 3/33538; H02M 3/33576; H02M 3/33569; H02M 3/33553; H02M 3/33546
See application file for complete search history.

(56) References Cited

U.S. PATENT DOCUMENTS 7,193,397 B2 * 3/2007 Dinh ..................... H02M 3/158
323/255
8,232,674 B2 * 7/2012 Phadke ................. H02M 3/285
307/31

(Continued)

*Primary Examiner* — Timothy J Dole
*Assistant Examiner* — Shahzeb K Ahmad
(74) *Attorney, Agent, or Firm* — Andrew C. Cheng

(57) ABSTRACT

The present invention discloses a circuitry for adjusting output voltage, which is set between an input voltage source and an internal device, and the circuitry comprises an output voltage converter, a signal controller, and first and second switching transistors. Wherein, the output voltage converter comprises an input coil, a first output coil and a second output coil that are connected in series. The first switching transistor is coupled to the first output coil and the internal device. The second switching transistor is coupled to the second output coil and the internal device. The signal controller is coupled to the internal device, and is further coupled to the first and the second switching transistors. The invention satisfies usage requirement between different internal devices of which the output voltages are greatly different without changing voltage output mode, and the objects to have output voltage with wide range, and lower cost of design.

6 Claims, 4 Drawing Sheets

(56) References Cited

U.S. PATENT DOCUMENTS

| | | | |
|---|---|---|---|
| 9,246,394 B2* | 1/2016 | Deng | H02M 3/33592 |
| 2009/0129768 A1* | 5/2009 | Tamegai | G03B 15/05 |
| | | | 396/206 |

* cited by examiner

CIRCUITRY AND METHOD FOR ADJUSTING OUTPUT VOLTAGE

CROSS REFERENCE TO RELATED APPLICATIONS

This application claims priority to Chinese Application Serial No. 201410250230.3 filed on Jun. 9, 2014, named as "A Circuitry and Method for Adjusting Output Voltage", content of which is incorporated herein by reference.

FIELD OF THE INVENTION

The present invention relates to field of electronic technology, and more particularly to a circuitry and method for adjusting output voltage.

BACKGROUND OF THE INVENTION

Because the direct current voltages used in devices inside the electronic equipment, such as television, display, audio, computer, etc., may be different, the input direct current voltage of an electronic equipment is converted to different output voltages for usage of different devices inside the electronic equipment.

Nowadays, a fixed voltage output mode is usually applied for converting the input direct current voltage into output voltage in order to satisfy the usage of specific internal device of the electronic equipment. The drawback is: when the internal device connected to the output voltage is changed and the output voltage for the current internal device is greatly away from the output voltage for the previous internal device such that the voltage output mode cannot satisfy the usage requirement of the current internal device, it is necessary to re-design a voltage output converting mode and therefore the design cost and design period are increased.

SUMMARY OF THE INVENTION

The technical problem solved by the embodiment of the present invention is to provide a backlight module and liquid crystal display apparatus which can firmly fix the quantum dots material in the backlight module, and can be assembled easily and quickly.

In order to solve the technical problem mentioned above, the first technique solution provided by the prevent invention is a circuitry for adjusting output voltage, which is set between an input voltage source and an internal device, comprising a output voltage converter, a first switching transistor, a second switching transistor and a signal controller; wherein the output voltage converter comprises an input coil for coupling the input voltage source, and a first output coil and a second output coil on a secondary side; wherein the first output coil and the second output coil are connected in series, a voltage output terminal of the first output coil is coupled to a drain of the first switching transistor, and a voltage output terminal of the second output coil is coupled to a drain of the second switching transistor;

the signal controller comprises a first level signal output terminal coupled to a gate of the first switching transistor, a second level signal output terminal coupled to a gate of the second switching transistor, and an input terminal coupled to a terminal of the internal device; the signal controller outputs a first level signal from the first level signal output terminal and a second level signal from the second level signal output terminal after and according to comparison between an activating voltage of the internal device and a preset first voltage threshold and a preset second voltage threshold;

a source of the first switching transistor is coupled to another terminal of the internal device, and the first switching transistor establishes or disconnects a conduction between the internal device and the first output coil in accordance to a level of the first level signal output from the first level signal output terminal, wherein an output voltage of the first output coil is output to the internal device when the conduction between the internal device and the first output coil is established;

a source of the second switching transistor is coupled to the another terminal of the internal device, and the second switching transistor establishes or disconnects a conduction between the internal device and the second output coil in accordance to a level of the second level signal output from the second level signal output terminal, wherein a superimposed output voltage generated by superimposing the output voltages of the first output coil and the second output coil is output to the internal device when the conduction between the internal device and the second output coil is established.

In which, the signal controller comprises a first comparator and a second comparator; wherein the first comparator comprises an input terminal coupled to the terminal of the internal device and the first level signal output terminal, obtains the activating voltage of the internal device through the input terminal, and outputs the first level signal from the first level signal output terminal after comparing the obtained activating voltage of the internal device with the preset first voltage threshold;

the second comparator comprises an input terminal coupled to the terminal of the internal device and the second level signal output terminal, obtains the activating voltage of the internal device through the input terminal, and after comparing the obtained activating voltage of the internal device with the preset second voltage threshold, outputs the second level signal from the second level signal output terminal; wherein the preset first voltage threshold is equal to the preset second voltage threshold.

Wherein, when the obtained activating voltage is smaller than the preset first voltage threshold, the first level signal is a high level signal and the second level signal is a low level signal, and the signal controller drives to turn on the first switching transistor and turn off the second switching transistor for establishing the conduction between the internal device and the first output coil and outputting the output voltage of the first output coil to the internal device.

Wherein, when the obtained activating voltage is greater than the preset first voltage threshold, the first level signal is a low level signal and the second level signal is a high level signal, and the signal controller drives to turn off the first switching transistor and turn on the second switching transistor for establishing the conduction between the internal device and the second output coil and outputting the superimposed output voltage generated by superimposing the output voltages of the first output coil and the second output coil to the internal device.

In order to solve the technical problem mentioned above, the second technique solution provided by the prevent invention is a circuitry for adjusting output voltage, which is set between an input voltage source and an internal device, comprising a output voltage converter, a first switching transistor, a second switching transistor, a third switching transistor, a logic operator, and a signal controller; wherein the output voltage converter comprises an input coil for coupling the input voltage source, and a first output coil, a second output coil and a third output coil on a secondary side; wherein the third output coil is set between the first output coil and the second output coil, and is connected in series with the first output coil and the second output coil; a voltage output terminal of the first output coil is coupled to drain of the first switching transistor; a voltage output terminal of the second output coil is coupled to drain of the second switching transistor; a voltage output terminal of the third output coil is coupled to drain of the third switching transistor;

the signal controller comprises a first level signal output terminal coupled to a gate of the first switching transistor, a second level signal output terminal coupled to a gate of the second switching transistor, and the input terminal coupled to the terminal of the internal device; according to a comparison made between the activating voltage of the internal device and the preset first voltage threshold and the preset second voltage threshold, the signal controller outputs the first level signal from the first level signal output terminal and outputs the second level signal from the second level signal output terminal;

the logic operator comprises a first terminal coupled to the first level signal output terminal, a second terminal coupled to the second level signal output terminal, and a third terminal coupled to a gate of the third switching transistor; or the logic operator comprises the first terminal coupled to the second level signal output terminal, the second terminal coupled to the first level signal output terminal, and the third terminal coupled to the gate of the third switching transistor; according to a level of the first level signal and a level of the second level signal, the logic operator determines a level of the third level signal output to the third switching transistor from the third terminal; wherein when the first level signal and the second level signal both are high level signals or low level signals, the third level signal is the high level signal; when the first level signal is the low level signal and the second level signal is the high level signal, or the first level signal is the high level signal and the second level signal is the low level signal, the third level signal is the low level signal;

a source of the first switching transistor is coupled to another terminal of the internal device, and the first switching transistor establishes or disconnects a conduction between the internal device and the first output coil in accordance to the level of the first level signal output from the first level signal output terminal, wherein an output voltage of the first output coil is output to the internal device when the conduction between the internal device and the first output coil is established;

a source of the second switching transistor is coupled to the another terminal of the internal device, and the second switching transistor establishes or disconnects a conduction between the internal device and the second output coil in accordance to the level of the second level signal output from the second level signal output terminal, wherein a superimposed output voltage generated by superimposing the output voltages of the first output coil, the second output coil and the third output coil is output to the internal device when the conduction between the internal device and the second output coil is established;

a source of the third switching transistor is coupled to the another terminal of the internal device, and the third switching transistor establishes or disconnects a conduction between the internal device and the third output coil in accordance to the level of the third level signal output from the logic operator, wherein a superimposed output voltage generated by superimposing the output voltages of the first output coil and the third output coil is output to the internal device when the conduction between the internal device and the third output coil is established.

In which, the signal controller comprises a first comparator and a second comparator; wherein the first comparator comprises an input terminal coupled to the terminal of the internal device and the first level signal output terminal, obtains the activating voltage of the internal device through the input terminal, and outputs the first level signal from the first level signal output terminal after comparing the obtained activating voltage of the internal device with the preset first voltage threshold;

the second comparator comprises an input terminal coupled to the terminal of the internal device and the second level signal output terminal, obtains the activating voltage of the internal device through the input terminal, and after comparing the obtained activating voltage of the internal device with the preset second voltage threshold, outputs the second level signal from the second level signal output terminal; wherein the preset second voltage threshold is greater than the preset first voltage threshold.

In which, the logic operator comprises a fourth switching transistor and a fifth switching transistor connected in parallel with the fourth switching transistor; wherein a drain of the fourth switching transistor is coupled to a drain of the fifth switching transistor, and further coupled to the gate of the third switching transistor; a source of the fourth switching transistor is coupled to a source of the fifth switching transistor; a gate of the fourth switching transistor is coupled to the first level signal output terminal, and a gate of the fifth switching transistor is coupled to the second level signal output terminal; or the drain of the fourth switching transistor is coupled to the drain of the fifth switching transistor, and further coupled to the gate of the third switching transistor; the source of the fourth switching transistor is coupled to the source of the fifth switching transistor; the gate of the fourth switching transistor is coupled to the second level signal output terminal, and the gate of the fifth switching transistor is coupled to the first level signal output terminal.

Wherein, when the obtained activating voltage is smaller than the preset first voltage threshold, the first level signal is the high level signal and the second level signal is the low level signal such that the third level signal is the low level signal, and the signal controller drives to turn on the first switching transistor and turn off the second switching transistor and the third switching transistor for establishing the conduction between the internal device and the first output coil and outputting the output voltage of the first output coil to the internal device.

Wherein, when the obtained activating voltage is between the preset first voltage threshold and the preset second voltage threshold, the first level signal and the second level signal are both the low level signals such that the third level signal is the high level signal, and the signal controller drives to turn on the third switching transistor and turn off the first switching transistor and the second switching transistor for establishing the conduction between the internal device and the third output coil and outputting the superimposed output voltage generated by superimposing the output voltages of the first output coil and the third output coil to the internal device.

Wherein, when the obtained activating voltage is greater than the preset second voltage threshold, the first level signal is the low level signal and the second level signal is the high level signal such that the third level signal is the low level signal, and the signal controller drives to turn on the second switching transistor and turn off the first switching transistor and the third switching transistor for establishing the conduction between the internal device and the second output coil and outputting the superimposed output voltage generated by superimposing the output voltages of the first output coil, the second output coil and the third output coil to the internal device.

In order to solve the technical problem mentioned above, the third technique solution provided by the prevent invention is a method for adjusting output voltage, wherein the method comprises:

obtaining an activating voltage of an internal device, and determining a first level signal and a second level signal of the circuitry according to the obtained activating voltage of the internal device, wherein the first level signal is a high level signal or a low level signal, and the second level signal is the high level signal or the low level signal; and driving to turn on or turn off each transistor coupled to each output coil by a signal controller of the circuitry according to the determined first level signal and the second level signal for controlling a value of an output voltage.

The circuitry and method for adjusting output voltage provided by the present invention has beneficial effect as follows:

Because each output coil of the circuitry is coupled to a switching transistor, the amount of sets of output coils can be controlled for outputting different voltages by driving each switching transistor to be turned on or turned off by the signal controller according to the level of the first level signal and the second level signal of the circuitry determined through the obtained activating voltage of the internal device. Accordingly, usage requirement between different internal devices of which the output voltages are greatly different can be satisfied without changing voltage output mode, and the objects to have output voltage with wide range, lower cost of design, and shorten design period can be realized compatibly.

DETAILED DESCRIPTION OF PREFERRED EMBODIMENTS

The best embodiment of the present invention will now be described with reference to the drawings.

Figure 1:
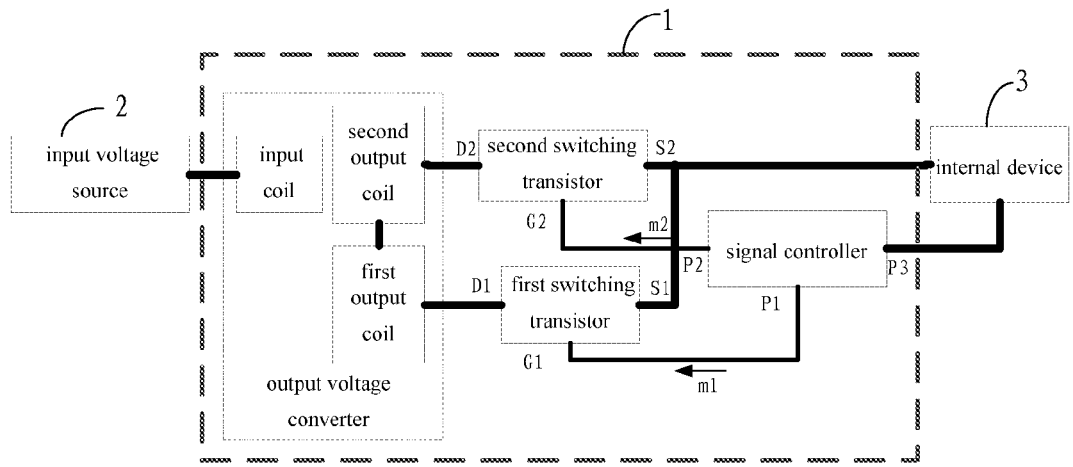
FIG. 1 is a connection schematic diagram of a circuitry for adjusting output voltage provided by the first embodiment of the present invention.
Figure 7:
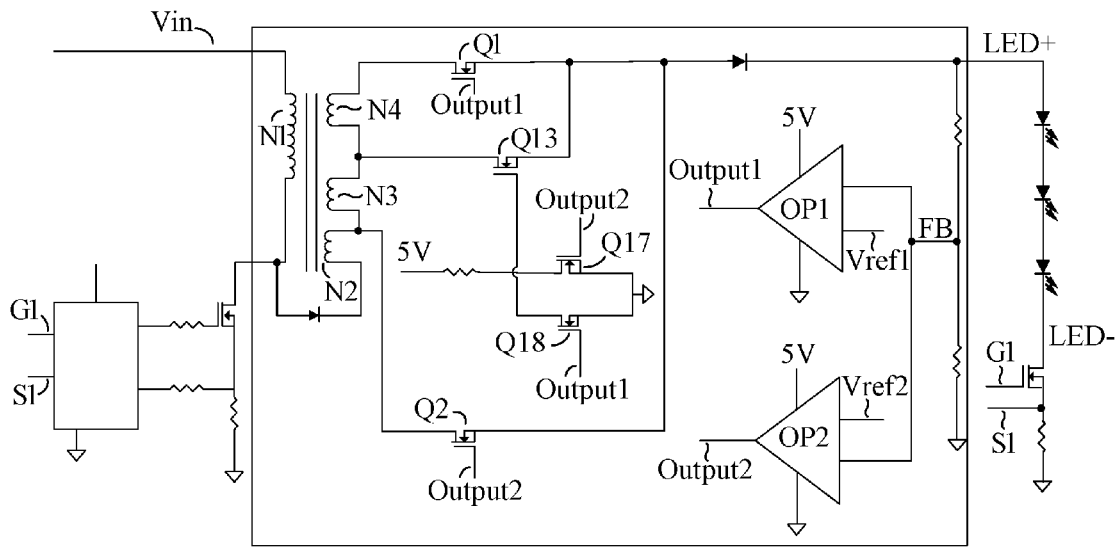
FIG. 7 is a theoretical circuitry diagram of the circuitry for adjusting output voltage provided by the second embodiment of the present invention.

Refer to FIG. 1 and FIG. 7, there is an embodiment of a circuitry for adjusting output voltage of the present invention.

Figure 2:
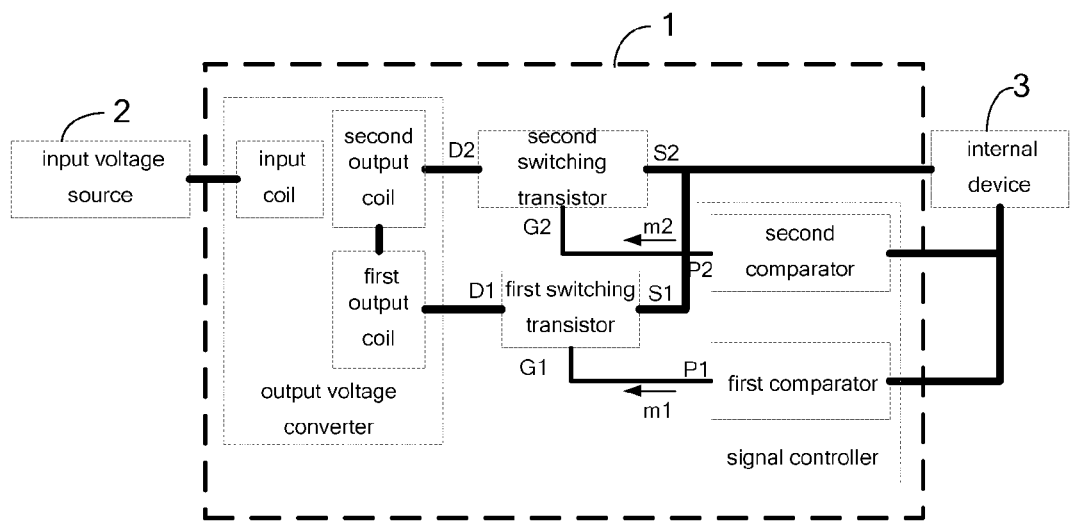
FIG. 2 is another connection schematic diagram of the circuitry for adjusting output voltage provided by the first embodiment of the present invention.
Figure 3:
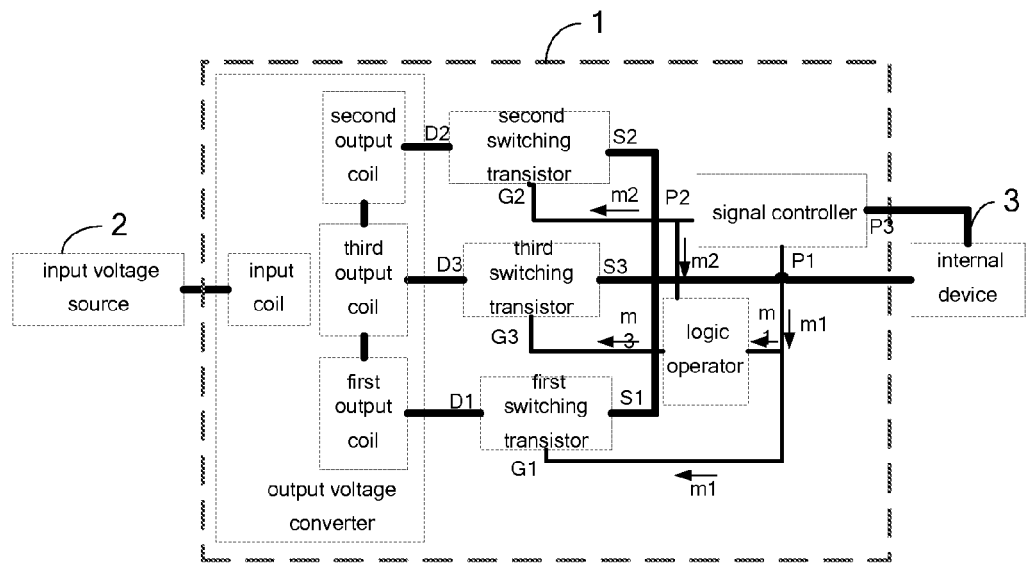
FIG. 3 is a connection schematic diagram of a circuitry for adjusting output voltage provided by the second embodiment of the present invention.
Figure 4:
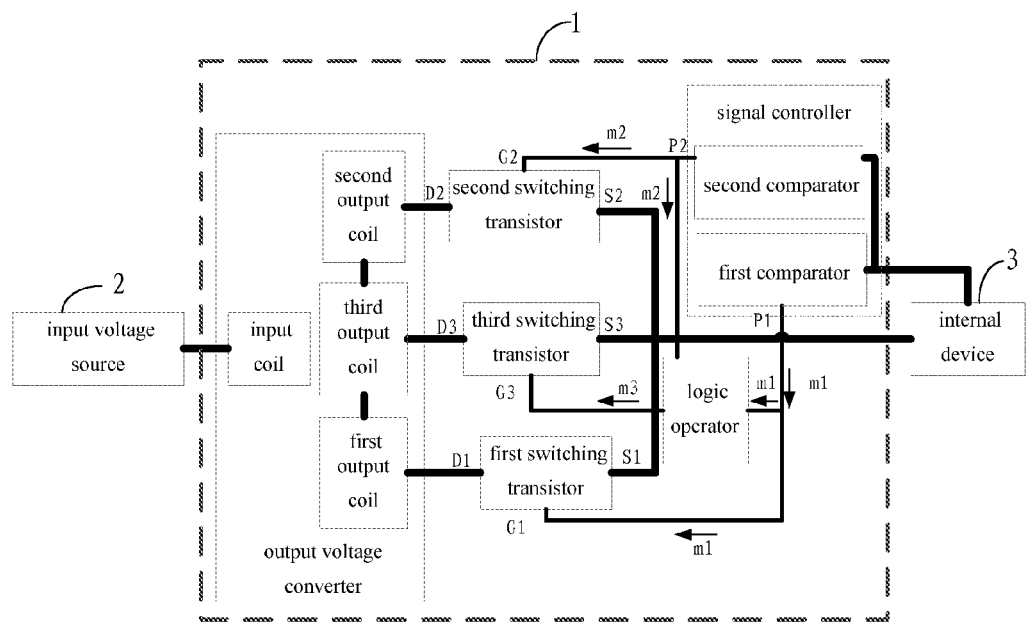
FIG. 4 is another connection schematic diagram of the circuitry for adjusting output voltage provided by the second embodiment of the present invention.
Figure 5:
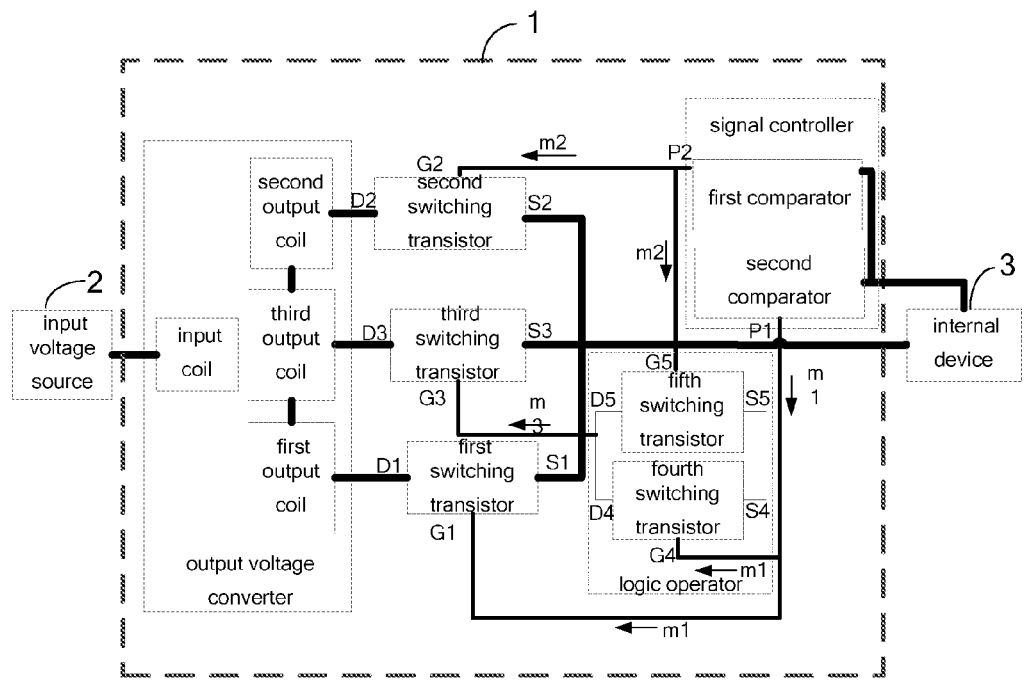
FIG. 5 is another connection schematic diagram of the circuitry for adjusting output voltage provided by the second embodiment of the present invention.
Figure 6:
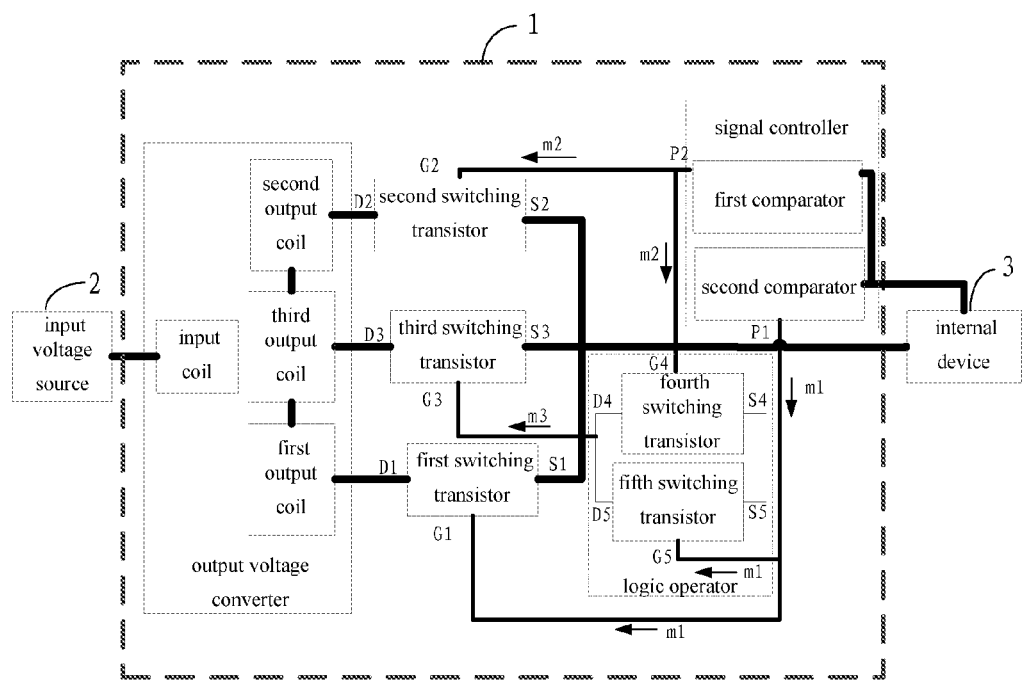
FIG. 6 is another connection schematic diagram of the circuitry for adjusting output voltage provided by the second embodiment of the present invention.

The FIG. 1 and FIG. 2 each shows a connection schematic diagram of a circuitry for adjusting output voltage provided by the first embodiment of the present invention. The circuitry 1 for adjusting output voltage in the first embodiment of the present invention comprises an output voltage converter, a first switching transistor, a second transistor, and a signal controller.

Wherein, the output voltage converter comprises an input coil for coupling the input voltage source 2 and obtaining the input voltage of the input voltage source 2, and a first output coil and a second output coil on a secondary side, which are both used for converting the input voltage to other voltage; wherein the first output coil and the second output coil are connected in series, a voltage output terminal of the first output coil is coupled to a drain D1 of the first switching transistor, and a voltage output terminal of the second output coil is coupled to a drain D2 of the second switching transistor.

The signal controller comprises a first level signal output terminal P1 coupled to a gate G1 of the first switching transistor, a second level signal output terminal P2 coupled to a gate G2 of the second switching transistor, and an input terminal P3 coupled to a terminal of the internal device 3; the signal controller obtains an activating voltage of the internal device 3 through the input terminal P3, and outputs a first level signal m1 from the first level signal output terminal P1 and a second level signal m2 from the second level signal output terminal P2 after and according to comparison between an activating voltage of the internal device 3 and a preset first voltage threshold and a preset second voltage threshold.

A source S1 of the first switching transistor is coupled to another terminal of the internal device 3, and the first switching transistor establishes or disconnects a conduction between the internal device and the first output coil in accordance to a level of the first level signal m1 output from the first level signal output terminal, wherein an output voltage of the first output coil is output to the internal device 3 when the conduction between the internal device 3 and the first output coil is established.

A source S2 of the second switching transistor is coupled to the another terminal of the internal device 3, and the second switching transistor establishes or disconnects a conduction between the internal device and the second output coil in accordance to a level of the second level signal m2 output from the second level signal output terminal, wherein a superimposed output voltage generated by superimposing the output voltages of the first output coil and the second output coil is output to the internal device 3 when the conduction between the internal device 3 and the second output coil is established.

Furthermore, the signal controller comprises a first comparator and a second comparator. A first voltage threshold is preset in the first comparator, and a second voltage threshold is preset in the second comparator. The preset first voltage threshold is equal to the preset second voltage threshold.

Wherein, the first comparator comprises an input terminal coupled to the terminal of the internal device 3, and the first level signal output terminal P1. The first comparator obtains the activating voltage of the internal device 3 through the input terminal, and outputs the first level signal m1 from the first level signal output terminal P1 after comparing the obtained activating voltage of the internal device 3 with the preset first voltage threshold.

The second comparator comprises an input terminal coupled to the terminal of the internal device, and the second level signal output terminal P2. The second comparator obtains the activating voltage of the internal device through the input terminal, and after comparing the obtained activating voltage of the internal device 3 with the preset second voltage threshold, outputs the second level signal m2 from the second level signal output terminal P2.

In the meantime, since there are two sets of output coils and the voltage thresholds to be compared are the same, i.e., the first voltage threshold is equal to the second voltage threshold, the first level signal m1 is a high level signal while the second level signal m2 is a low level signal when the obtained activating voltage is smaller than the preset first voltage threshold, and the first level signal m1 is the low level signal while the second level signal m2 is the high level signal when the obtained activating voltage is greater than or equal to the preset first voltage threshold.

When the first level signal m1 is the high level signal and the second level signal m2 is the low level signal (i.e., the activating voltage is smaller than the preset first voltage threshold), the signal controller drives to turn on the first switching transistor and to turn off the second switching transistor for establishing the conduction between the internal device 3 and the first output coil, and outputting the output voltage of the first output coil to the internal device 3. When the first level signal m1 is the low level signal and the second level signal m2 is the high level signal (i.e., the obtained activating voltage is greater than the preset first voltage threshold), the signal controller drives to turn off the first switching transistor and turn on the second switching transistor for establishing the conduction between the internal device 3 and the second output coil, and outputting the superimposed output voltage generated by superimposing the output voltages of the first output coil and the second output coil to the internal device 3.

The theory which makes the circuitry for adjusting output voltage in the first embodiment of the present invention work is: the signal controller automatically monitors and obtains the activating voltage of the internal device (such as the Light Emitting Diode), and outputs different level signals according to a comparison result after comparing the activating voltage in the signal controller, such that voltages with different values are controlled to be output for satisfying the usage requirements of different internal devices by driving the signal controller to turn on or off each switching transistor coupled to each output coil. In other words, the design members can adjust the turn ratio of the input coil and the output coil according to activating voltages of different internal devices and real requirements without changing voltage output mode.

For example, the output coil includes a first output coil and a second output coil, wherein the turn ratio of the input coil and the first output coil is 1:A; the turn ratio of the input coil and summation of the first and second output coils is 1:B. When the activating voltage U0 of the internal device<the first voltage threshold U1, the first switching transistor K1 coupled to the first output coil is turned on, and the second switching transistor K2 coupled to the second output coil is turned off, such that the output coil is with the first output coil. The output voltage Vo on the first output coil=A*input voltage Vi>U0. In order to satisfy that the output voltage Vo=activating voltage U0 of the internal device, it can be realized by adjusting turn ratio of the input coil and the first output coil. For the same reason, when the activating voltage U0 of the internal device>the first voltage threshold U1, the first switching transistor K1 coupled to the first output coil is turned off, and the second switching transistor K2 coupled to the second output coil is turned on, such that the output coil is with two set output coils, i.e., the first output coil and the second output coil. The output voltage Vo on the second output coil=B*input voltage Vi>U0. In order to satisfy that the output voltage Vo=activating voltage U0 of the internal device, it can be realized by adjusting turn ratio of the input coil and summation of the first and second output coils.

Comparing with the circuitry for adjusting output voltage in the first embodiment of the present invention, the circuitry for adjusting output voltage further provided by the second embodiment of the present invention not only comprises the structure and connection relationship of the circuitry for adjusting output voltage described in the first embodiment of the present invention, but also newly adds a third output coil, a third switching transistor and a logic operator.

The figures from FIG. 3 to FIG. 6 show the connection schematic diagram of the circuitry for adjusting output voltage provided by the second embodiment of the present invention. The circuitry 1 for adjusting output voltage in the second embodiment of the present invention is set between the input voltage source 2 and the internal device 3. The circuitry 1 comprises an output voltage converter, a first switching transistor, a second switching transistor, a third switching transistor, a logic operator and a signal controller.

Wherein, the output voltage converter comprises an input coil coupled to the input voltage source 2 for obtaining an input voltage of the input voltage source 2, and a first output coil, a second output coil, and a third output coil each at secondary side, wherein the first output coil, the second output coil and the third output coil each is used for converting the input voltage into other voltage. Wherein, the third output coil is set between the first output coil and the second output coil and is connected in series with the first output coil and the second output coil. A voltage output terminal of the first output coil is coupled to a drain D1 of the first switching transistor; a voltage output terminal of the second output coil is coupled to a drain D2 of the second switching transistor; an voltage output terminal of the third output coil is coupled to a drain D3 of the third switching transistor.

The signal controller comprises a first level signal output terminal P1 coupled to a gate G1 of the first switching transistor, a second level signal output terminal P2 coupled to a gate G2 of the second switching transistor, and the input terminal P3 coupled to the terminal of the internal device 3. The signal controller obtains the activating voltage of the internal device 3 through the input terminal P3, and, according to a comparison made between the activating voltage of the internal device and the preset first voltage threshold and the preset second voltage threshold, the signal controller outputs the first level signal m1 from the first level signal output terminal P1 and outputs the second level signal m2 from the second level signal output terminal P2, wherein the preset second voltage threshold is greater than the preset first voltage threshold.

A first terminal L1 of the logic operator is coupled to the first level signal output terminal P1; a second terminal L2 is coupled to the second level signal output terminal P2; a third terminal L3 is coupled to a gate G3 of the third switching transistor. Or, the first terminal L1 of the logic operator is coupled to the second level signal output terminal P2; the second terminal L2 is coupled to the first level signal output terminal P1; the third terminal L3 is coupled to the gate G3 of the third switching transistor.

The logic operator determines a level of the third level signal m3 output to the third switching transistor from the third terminal P3 according to a level of the first level signal m1 and a level of the second level signal m2; wherein when the first level signal m1 and the second level signal m2 both are low level signals or high level signals, the third level signal m3 is the high level signal; when the first level signal m1 is the low level signal and the second level signal m2 is the high level signal, or the first level signal m1 is the high level signal and the second level signal m2 is the low level signal, the third level signal m3 is the low level signal.

A source S1 of the first switching transistor is coupled to another terminal of the internal device 3, and the first switching transistor establishes or disconnects a conduction between the internal device 3 and the first output coil in accordance to the level of the first level signal m1 output from the first level signal output terminal, wherein an output voltage of the first output coil is output to the internal device 3 when the conduction between the internal device 3 and the first output coil is established.

A source S2 of the second switching transistor is coupled to the another terminal of the internal device 3, and the second switching transistor establishes or disconnects a conduction between the internal device 3 and the second output coil in accordance to the level of the second level signal m2 output from the second level signal output terminal, wherein a superimposed output voltage generated by superimposing the output voltages of the first output coil, the second output coil and the third output coil is output to the internal device 3 when the conduction between the internal device 3 and the second output coil is established.

A source S3 of the third switching transistor is coupled to the another terminal of the internal device 3, and the third switching transistor establishes or disconnects a conduction between the internal device 3 and the third output coil in accordance to the level of the third level signal m3 output from the logic operator, wherein a superimposed output voltage generated by superimposing the output voltages of the first output coil and the third output coil is output to the internal device 3 when the conduction between the internal device 3 and the third output coil is established.

In the mean time, there are three sets of output coils for extending range of the output voltage. The preset second voltage threshold in the signal controller should be greater than the preset first voltage threshold such that the range comparing with the activating voltage of the internal device can be extended, and accordingly, the scope of using different internal device can be extended. When the obtained activating voltage is smaller than the preset first voltage threshold, the first level signal m1 is the high level signal and the second level signal m2 is the low level signal such that the obtained third level signal m3 is the low level signal. When the obtained activating voltage is between the preset first voltage threshold and the preset second voltage threshold, the first level signal m1 and the second level signal m2 are both the low level signals such that the obtained third level signal m3 is the high level signal. When the obtained activating voltage is greater than the preset second voltage threshold, the first level signal m1 is the low level signal and the second level signal m2 is the high level signal such that the obtained third level signal m3 is the low level signal.

Furthermore, the signal controller comprises a first comparator and a second comparator, and the first voltage threshold is preset and preset in the first comparator while the second voltage threshold is preset in the second comparator.

Wherein, the first comparator comprises an input terminal coupled to the terminal of the internal device 3, and the first level signal output terminal P1. The first comparator obtains the activating voltage of the internal device 3 through the input terminal, and outputs the first level signal m1 from the first level signal output terminal P1 after comparing the obtained activating voltage of the internal device 3 with the preset first voltage threshold.

The second comparator comprises an input terminal coupled to the terminal of the internal device, and the second level signal output terminal P2. The second comparator obtains the activating voltage of the internal device 3 through the input terminal, and after comparing the obtained activating voltage of the internal device 3 with the preset second voltage threshold, outputs the second level signal m2 from the second level signal output terminal P2.

Furthermore, the logic operator comprises a fourth switching transistor and a fifth switching transistor connected in parallel with the fourth switching transistor.

Wherein, a drain D4 of the fourth switching transistor is coupled to a drain D5 of the fifth switching transistor, and further coupled to the gate G3 of the third switching transistor. A source S4 of the fourth switching transistor is coupled to a source S5 of the fifth switching transistor. A gate G4 of the fourth switching transistor is coupled to the first level signal output terminal P1, and a gate G5 of the fifth switching transistor is coupled to the second level signal output terminal P2.

Or, the drain D4 of the fourth switching transistor is coupled to the drain D5 of the fifth switching transistor, and further coupled to the gate G3 of the third switching transistor. The source S4 of the fourth switching transistor is coupled to the source S5 of the fifth switching transistor. The gate G4 of the fourth switching transistor is coupled to the second level signal output terminal P2, and the gate G5 of the fifth switching transistor is coupled to the first level signal output terminal P1.

When the obtained activating voltage is smaller than the preset first voltage threshold, the first level signal m1 is the high level signal and the second level signal m2 is the low level signal such that the obtained third level signal m3 is the low level signal. The signal controller drives to turn on the first switching transistor and turn off the second switching transistor and the third switching transistor for establishing the conduction between the internal device 3 and the first output coil and outputting the output voltage of the first output coil to the internal device 3.

When the obtained activating voltage is between the preset first voltage threshold and the preset second voltage threshold, the first level signal m1 and the second level signal m2 are both the low level signals such that the obtained third level signal m3 is the high level signal. The signal controller drives to turn on the third switching transistor and turn off the first switching transistor and the second switching transistor for establishing the conduction between the internal device 3 and the third output coil, and outputting the superimposed output voltage generated by superimposing the output voltages of the first output coil and the third output coil to the internal device 3.

When the obtained activating voltage is greater than the preset second voltage threshold, the first level signal m1 is the low level signal and the second level signal m2 is the high level signal such that the obtained third level signal m3 is the low level signal. The signal controller drives to turn on the second switching transistor and turn off the first switching transistor and the third switching transistor for establishing the conduction between the internal device 3 and the second output coil, and outputting the superimposed output voltage generated by superimposing the output voltages of the first output coil, the second output coil and the third output coil to the internal device 3.

The theory which makes the circuitry for adjusting output voltage in the second embodiment of the present invention work is the same as the theory making the circuitry for adjusting output voltage in the first embodiment of the present invention work, and therefore is not explained here.

For example, the output coil includes a first output coil, a second output coil, and a third output coil set between the first output coil and the second output coil, wherein the turn ratio of the input coil and the first output coil is 1:A; the turn ratio of the input coil and summation of the first and third output coils is 1:B; the turn ratio of the input coil and summation of the first, second and third output coils is 1:C.

When the activating voltage U0 of the internal device<the first voltage threshold U1, the first switching transistor K1 coupled to the first output coil is turned on, and the second switching transistor K2 coupled to the second output coil and the third switching transistor K3 coupled to the third output coil are turned off, such that the output coil is with the first output coil. The output voltage Vo on the first output coil=A*input voltage Vi>U0. In order to satisfy that the output voltage Vo=activating voltage U0 of the internal device, it can be realized by adjusting turn ratio of the input coil and the first output coil.

For the same reason, when the second voltage threshold U2>activating voltage U0 of the internal device>the first voltage threshold U1, the first switching transistor K1 coupled to the first output coil is turned off; the second switching transistor K2 coupled to the second output coil is turned off; and the third transistor K3 coupled to the third output coil is turned on, such that the output coil is with two set output coils, i.e., the first output coil and the third output coil. The output voltage Vo on the third output coil=B*input voltage Vi>U0, and the output voltage Vo<C*input voltage Vi. In order to satisfy that the output voltage Vo=activating voltage U0 of the internal device, it can be realized by adjusting turn ratio of the input coil and summation of the first and third output coils.

For the same reason, when the activating voltage U0 of the internal device>the second voltage threshold U2 (and>the first voltage threshold U1 as well), the first switching transistor K1 coupled to the first output coil is turned off; the third switching transistor K3 coupled to the third output coil are turned off; and the second switching transistor K2 coupled to the second output coil is turned on, such that the output coil is with three set output coils, i.e., the first, second, and third output coils. The output voltage Vo on the second output coil=C*input voltage Vi>U0. In order to satisfy that the output voltage Vo=activating voltage U0 of the internal device, it can be realized by adjusting turn ratio of the input coil and summation of the first, second, and third output coils.

FIG. 7 shows a theoretical circuitry diagram of the circuitry for adjusting output voltage provided by the second embodiment of the present invention. The circuitry in the square frame is the circuitry for adjusting output voltage. The circuitry obtains the input voltage Vin of the input voltage source, which is output to the internal device LED after being output converted.

Wherein, the output voltage converter comprises an input coil N1, and a first output coil N2, a second output coil N4, and a third output coil N3 at the secondary side. The first output coil N2, the second output coil N4 and the third output coil N3 is connected in series.

The signal controller comprises a first comparator OP2 and a second comparator OP1. Each of both comparators obtains the activating voltage FB of the internal device LED. The activating voltage FB is compared with the first voltage threshold Vref2 in the first comparator OP2, and then the level signal OutPut2 is output as the first level signal. The activating voltage FB is compared with the second voltage threshold Vref1 in the second comparator OP1, and then the level signal OutPut1 is output as the second level signal.

The logic operator comprises the fourth switching transistor Q17 and the fifth switching transistor Q18. They are connected in parallel, respectively obtains different level signal, and output the third level signal to the third switching transistor Q13.

The first switching transistor Q2 is coupled between the first output coil N2 and the internal device LED, and obtains the first level signal OutPut2. When the first switching transistor Q2 is turned on, the output voltage of the first output coil N2 is output to the internal device LED.

The second switching transistor Q1 is coupled between the second output coil N4 and the internal device LED, and obtains the second level signal OutPut1. When the second switching transistor Q1 is turned on, the superimposed output voltage generated by superimposing the output voltages of the first output coil N2, the second output coil N4 and the third output coil N3 is output to the internal device LED.

The third switching transistor Q13 is coupled between the third output coil N3 and the internal device LED. When the third switching transistor Q13 is turned on, the superimposed output voltage generated by superimposing the output voltages of the first output coil N2 and the third output coil N3 is output to the internal device LED.

Figure 8:
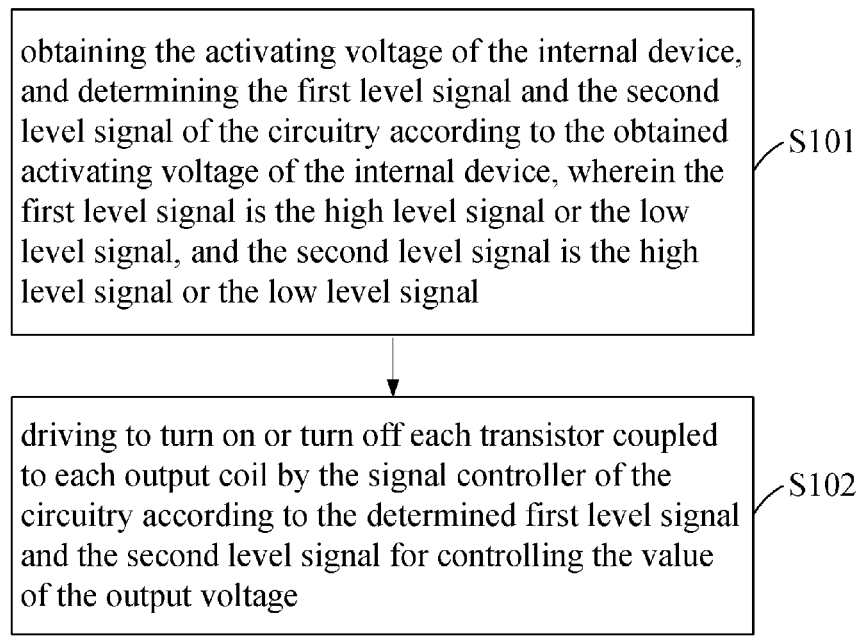
FIG. 8 is a flow chart of the method for adjusting output voltage provided by the third embodiment of the present invention.

Refer to FIG. 8 together, an embodiment of method for adjusting output voltage of the present invention is shown.

As shown in FIG. 8, a flow chart of the method for adjusting output voltage provided by the third embodiment of the present invention is provided. The method for adjusting output voltage in the third embodiment of the present invention can be implemented in the circuitry for adjusting output voltage in the first embodiment of the present invention or in the second embodiment of the present invention. The method comprises:

step S101: obtaining the activating voltage of the internal device, and determining the first level signal and the second level signal of the circuitry according to the obtained activating voltage of the internal device, wherein the first level signal is the high level signal or the low level signal, and the second level signal is the high level signal or the low level signal; and step S102: driving to turn on or turn off each transistor coupled to each output coil by the signal controller of the circuitry according to the determined first level signal and the second level signal for controlling the value of the output voltage.

The circuitry and method for adjusting output voltage provided by the present invention has beneficial effect as follows.

Because each output coil of the circuitry is coupled to a switching transistor, the amount of sets of output coils can be controlled for outputting different voltages by driving each switching transistor to be turned on or turned off by the signal controller according to the level of the first level signal and the second level signal of the circuitry determined through the obtained activating voltage of the internal device. Accordingly, usage requirement between different internal devices of which the output voltages are greatly different can be satisfied without changing voltage output mode, and the objects to have output voltage with wide range, lower cost of design, and shorten design period can be realized compatibly.

Those with ordinary skill in the art can realize that all or a part of steps of the method described in the above embodiment can be implement by instructing related hardware through a procedure. The procedure can be stored in a computer readable medium, such as ROM/RAM, magnetic disk, compact disk, etc.

While the invention has been described in terms of what is presently considered to be the most practical and preferred embodiments, it is to be understood that the invention needs not be limited to the disclosed embodiment. The equivalent variation made basing on the claims of the present invention are included within the scope of the present invention.

What is claimed is:

1. A circuitry for adjusting output voltage, which is set between an input voltage source and an internal device, comprising an output voltage converter, a first switching transistor, a second switching transistor, a third switching transistor, a logic operator, and a signal controller; wherein the output voltage converter comprises an input coil for coupling the input voltage source, and a first output coil, a second output coil and a third output coil on a secondary side; wherein the third output coil is set between the first output coil and the second output coil, and is connected in series with the first output coil and the second output coil; a voltage output terminal of the first output coil is coupled to a drain of the first switching transistor; a voltage output terminal of the second output coil is coupled to a drain of the second switching transistor; a voltage output terminal of the third output coil is coupled to a drain of the third switching transistor;

the signal controller comprises a first level signal output terminal coupled to a gate of the first switching transistor, a second level signal output terminal coupled to a gate of the second switching transistor, and the input terminal coupled to the terminal of the internal device; according to a comparison made between the activating voltage of the internal device and the preset first voltage threshold and the preset second voltage threshold, the signal controller outputs the first level signal from the first level signal output terminal and outputs the second level signal from the second level signal output terminal;

the logic operator comprises a first terminal coupled to the first level signal output terminal, a second terminal coupled to the second level signal output terminal, and a third terminal coupled to a gate of the third switching transistor; or the logic operator comprises the first terminal coupled to the second level signal output terminal, the second terminal coupled to the first level signal output terminal, and the third terminal coupled to the gate of the third switching transistor; according to a level of the first level signal and a level of the second level signal, the logic operator determines a level of the third level signal output to the third switching transistor from the third terminal; wherein when the first level signal and the second level signal both are high level signals or low level signals, the third level signal is the high level signal; when the first level signal is the low level signal and the second level signal is the high level signal, or the first level signal is the high level signal and the second level signal is the low level signal, the third level signal is the low level signal;

a source of the first switching transistor is coupled to another terminal of the internal device, and the first switching transistor establishes or disconnects a conduction between the internal device and the first output coil in accordance to the level of the first level signal output from the first level signal output terminal, wherein an output voltage of the first output coil is output to the internal device when the conduction between the internal device and the first output coil is established;

a source of the second switching transistor is coupled to the another terminal of the internal device, and the second switching transistor establishes or disconnects a conduction between the internal device and the second output coil in accordance to the level of the second level signal output from the second level signal output terminal, wherein a superimposed output voltage generated by superimposing the output voltages of the first output coil, the second output coil and the third output coil is output to the internal device when the conduction between the internal device and the second output coil is established;

a source of the third switching transistor is coupled to the another terminal of the internal device, and the third switching transistor establishes or disconnects a conduction between the internal device and the third output coil in accordance to the level of the third level signal output from the logic operator, wherein a superimposed output voltage generated by superimposing the output voltages of the first output coil and the third output coil is output to the internal device when the conduction between the internal device and the third output coil is established.

2. The circuitry of claim 1, wherein the signal controller comprises a first comparator and a second comparator; wherein the first comparator comprises an input terminal coupled to the terminal of the internal device and the first level signal output terminal, obtains the activating voltage of the internal device through the input terminal, and outputs the first level signal from the first level signal output terminal after comparing the obtained activating voltage of the internal device with the preset first voltage threshold;

the second comparator comprises an input terminal coupled to the terminal of the internal device and the second level signal output terminal, obtains the activating voltage of the internal device through the input terminal, and after comparing the obtained activating voltage of the internal device with the preset second voltage threshold, outputs the second level signal from the second level signal output terminal; wherein the preset second voltage threshold is greater than the preset first voltage threshold.

3. The circuitry of claim 2, wherein the logic operator comprises a fourth switching transistor and a fifth switching transistor connected in parallel with the fourth switching transistor; wherein a drain of the fourth switching transistor is coupled to a drain of the fifth switching transistor, and further coupled to the gate of the third switching transistor; a source of the fourth switching transistor is coupled to a source of the fifth switching transistor; a gate of the fourth switching transistor is coupled to the first level signal output terminal, and a gate of the fifth switching transistor is coupled to the second level signal output terminal; or the drain of the fourth switching transistor is coupled to the drain of the fifth switching transistor, and further coupled to the gate of the third switching transistor; the source of the fourth switching transistor is coupled to the source of the fifth switching transistor; the gate of the fourth switching transistor is coupled to the second level signal output terminal, and the gate of the fifth switching transistor is coupled to the first level signal output terminal.

4. The circuitry of claim 3, wherein when the obtained activating voltage is smaller than the preset first voltage threshold, the first level signal is the high level signal and the second level signal is the low level signal such that the third level signal is the low level signal, and the signal controller drives to turn on the first switching transistor and turn off the second switching transistor and the third switching transistor for establishing the conduction between the internal device and the first output coil and outputting the output voltage of the first output coil to the internal device.

5. The circuitry of claim 3, wherein when the obtained activating voltage is between the preset first voltage threshold and the preset second voltage threshold, the first level signal and the second level signal are both the low level signals such that the third level signal is the high level signal, and the signal controller drives to turn on the third switching transistor and turn off the first switching transistor and the second switching transistor for establishing the conduction between the internal device and the third output coil and outputting the superimposed output voltage generated by superimposing the output voltages of the first output coil and the third output coil to the internal device.

6. The circuitry of claim 3, wherein when the obtained activating voltage is greater than the preset second voltage threshold, the first level signal is the low level signal and the second level signal is the high level signal such that the third level signal is the low level signal, and the signal controller drives to turn on the second switching transistor and turn off the first switching transistor and the third switching transistor for establishing the conduction between the internal device and the second output coil and outputting the superimposed output voltage generated by superimposing the output voltages of the first output coil, the second output coil and the third output coil to the internal device.

* * * * *